April 15, 1941. C. M. KENDRICK 2,238,063
FLUID PRESSURE SYSTEM AND VALVE MECHANISM THEREFOR
Filed April 17, 1939 4 Sheets-Sheet 1

Fig. 1.

INVENTOR.
Charles M. Kendrick
BY
ATTORNEYS.

Patented Apr. 15, 1941

2,238,063

UNITED STATES PATENT OFFICE 2,238,063

FLUID PRESSURE SYSTEM AND VALVE MECHANISM THEREFOR

Charles M. Kendrick, New York, N. Y., assignor to Manly Corporation, Washington, D. C., a corporation of Delaware Application April 17, 1939, Serial No. 268,253

18 Claims. (Cl. 103—38)

This application is a continuation in part of my co-pending application filed May 12, 1938, Serial Number 207,512 and is also a continuation in part of my co-pending application filed January 14, 1939, Serial Number 250,864.

This invention relates to valve mechanism for controlling the operation of power-operated output varying means for pumps of variable capacity or output in which said output varying means are actuated by pressure fluid delivered by said pump. It relates more particularly to a novel valve mechanism adapted to perform the functions both of controlling the pump's output and also providing relief for excess fluid pressure.

Absolute zero output of a pump of variable capacity or output depends upon positioning the output-determining element thereof with great precision relative to the position of some other part or parts of the pump, and any variation whatsoever from the theoretically correct position of the output-determining element will result in the delivery of a corresponding amount of fluid by the pump. For example, where output of the pump is determined by eccentricity of one or more of its elements with respect to another, which is usually the case, absolute zero delivery can be obtained only when absolutely no eccentricity exists between these elements, as even the slightest eccentricity will produce a small pump output. In actual practice, therefore, absolute zero is difficult to obtain or requires extreme precision in manufacture and adjustment with consequent cost increase and difficulty in use, and this is particularly true when the output determining element is actuated by hydraulic power apparatus.

As a result, there is frequently a small output of a variable capacity pump when its controls have been placed in what is supposedly an absolute zero output position and provision must be made for the escape of the fluid volume thus delivered to prevent existence of excessive pressures or "creeping" movement of the driven member, or both. For this reason it has heretofore been customary to provide a separate relief valve adapted to open to permit escape of pressure fluid or to employ a separate by-pass valve together with mechanism for its operation which is co-ordinated with the pump's output-determining element in such manner that the by-pass valve is opened thereby when the output-determining element reaches or approaches its zero or minimum output position. Both of these arrangements require separate valve mechanism and frequently also require linkage or the like, thus adding to the cost and to the space and time required for installation.

One object of the present invention is a simple, compact, combined control and relief valve mechanism capable of performing the several functions in a particularly effective manner; that is to say, valve mechanism capable both of permitting escape of fluid to relieve excess pump pressure and also capable of varying the pump's output by controlling the operation of its hydraulic-power-actuated output varying means. Another object is to provide combined relief and control valve mechanism of this character for use in connection with hydraulic-power-operated output varying means which is actuated, in whole or in part, by pressure fluid delivered by the variable capacity pump controlled thereby. A further object is to provide combined relief and control valve mechanism of this general type which is active to first establish fluid connection whereby the output of the pump is reduced to minimum and to then provide relief valve action if excess pump pressure continues to exist thereafter. Other and more specific objects will appear from the description which follows.

Valve mechanism of this general class finds its widest present use in connection with variable output pumps employed as the source of pressure fluid for hydraulically actuated devices and the invention will be described in connection with such use.

The present invention may be employed in connection with various types of pump output control devices and in order to illustrate the wide range of structures in which it may be embodied, several embodiments are shown in the accompanying drawings, in which.

Figure 1:
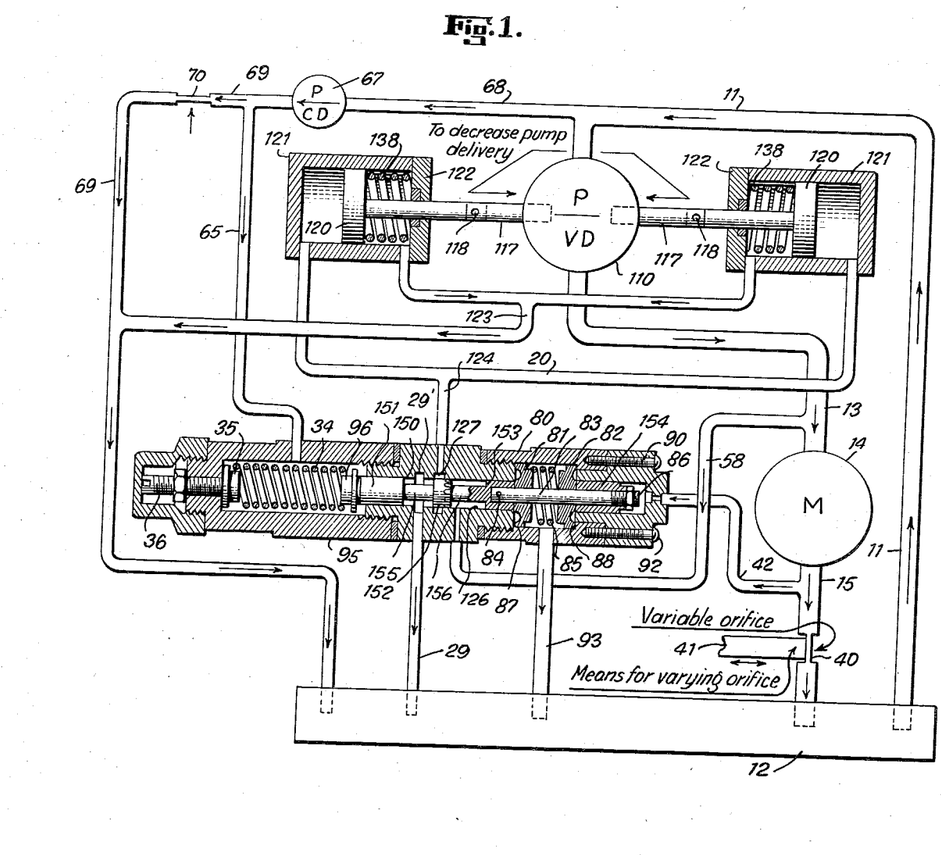
Fig. 1 is a diagrammatic view illustrating a fluid pressure system which includes an embodiment of the present invention in valve mechanism in which the output of the pump is controlled and varied by varying the size or extent of opening of a variable metering orifice, whereby any pump output from maximum to minimum is readily obtained, and in which relief valve action is also provided.

Referring now to these drawings, Fig. 1 illustrates the present invention in connection with a fluid circuit which includes a "double" or "double-acting" pump 110 comprising two "pumping sections" or parts. Pumps of this general character are well known in the art and the internal structure of the pump 110 forms no part of the present invention. It may be, for example, of the type disclosed in my co-pending application filed January 14, 1939, Serial Number 250,864, or it may be of one of the types shown in United States Patents Nos. 2,141,170 and 2,141,171, or of any other suitable type. The pump 110 is provided with an inlet conduit 11 through which fluid from the reservoir 12 is supplied to both of said pump's two pumping sections and said pump is also provided with a discharge conduit having a portion 13 into which the output of both pumping sections is delivered and which is here shown as leading to a fluid motor 14. Fluid discharged by the fluid motor 14 is returned to the reservoir 12 through the portion 15 of the discharge conduit. With this arrangement, motive fluid delivered by the pump 110 operates the fluid motor 14 and the operation of the latter is controlled by varying the output of said pump 110.

As previously stated, the pump 110 comprises two pumping sections or parts, each of which is a complete pumping unit, and the output of the pump 110 is comprised of the combined outputs of said two pumping sections or parts. The capacity or output per revolution of each pumping section may be infinitely varied from minimum to maximum by lateral movement of its delivery-determining element or adjusting rod 117; in the present instance the output of each pumping section is increased by movement of its adjusting rod 117 in an outward direction with respect to the center of the pump 110, and vice versa.

The arrangement by which the combined outputs of the two pumping sections is varied and controlled, in order to vary and control the output of the pump 110, is similar to that disclosed and claimed in the above-mentioned application Serial Number 250,864. For this purpose each adjusting rod 117 is adapted to be actuated or moved in an inward direction by a fluid pressure operated adjusting piston 120, to which it is attached as at 118, said adjusting piston 120 moving in an adjusting cylinder 121. The fluid pressure tending to move the adjusting pistons 120 inwardly is opposed by action of fluid pressure inside the pump which tends to move the adjusting rods 117 outwardly and is also opposed by a coil spring 138 which bears against the adjacent face of its piston 120 and against the cover 122 which closes the corresponding adjusting cylinder 121. The outer ends of the adjusting cylinders 121 are connected through a communicating pipe system or passage 20 containing an incompressible fluid such, for example, as oil, etc. In order to control the pump delivery per revolution incompressible fluid is admitted to or withdrawn from the communicating passage 20 and the cylinders 121. This admission and exhaust of fluid for this purpose is effected through a branch pipe or passage 124 which in the present instance leads to and connects with the annular cylinder port 127 in the valve mechanism to be presently described. Thus, by the construction and arrangement shown, each of the adjusting pistons 120 and its corresponding adjusting rod 117 is at all times floatingly balanced between the pressures generated in the two halves or sections of the pump and each is independently movable to assume the balanced condition or position. The inner ends of the adjusting cylinders 121 are connected with a branched passage 123 leading to the reservoir in order to permit the escape of any fluid leaking past the adjusting pistons 120.

The valve mechanism illustrated in Fig. 1 is similar to control valve means disclosed and claimed in the above-mentioned co-pending application Serial No. 207,512. It includes a valve piston 150 slidably fitted within the valve bore 126 of the valve housing 125 and having three heads 151, 152 and 153 respectively, separated by the reduced portions 155 and 156. The head 152 covers the cylinder port 127 when the valve piston 150 is in its neutral position in which it is shown in Fig. 1. Movement of the valve piston 150 to the right of its neutral position connects the cylinder port 127 with the portion of the valve bore surrounding the valve piston's reduced portion 155, so that fluid may be exhausted from the outer ends of the adjusting cylinders 121, such exhausted fluid returning to the reservoir 12 through the passage 29. The adjusting pistons 120 move outward under the influence of the springs 138 (and action of internal pump pressure) when the outer ends of the adjusting cylinders 121 are thus connected with the exhaust, as already explained.

Movement of the valve piston 150 to the left of its neutral position connects the cylinder port 127 with the portion of the valve bore 126 surrounding the valve piston's reduced portion 156; pressure fluid supplied to this portion of the valve bore 126, as through the passage 58, may then pass around the reduced portion 156, through the cylinder port 127 and the branched passage 124 to the outer ends of the adjusting cylinders 121, causing the adjusting pistons 120 to move in an inward or delivery-decreasing direction. The valve head 152 is shown as provided with a number of conventional V-notches on its end adjacent the reduced portion 156, these notches providing a relatively gradual connection between the reduced portion 156 and the cylinder port 127 when the valve piston 150 moves to the left of its neutral position, thus reducing any tendency toward abrupt movement of the adjusting pistons 120.

A centering mechanism is located in the bore of a housing 80 which is suitably attached to the right hand end of the valve housing 125, as by threaded engagement therewith. The outer end of the housing 80 is in turn closed by an auxiliary valve housing 90, the purpose of which will be later explained, and the two parts are appropriately fastened together, as by the screws 92. It is preferable that there be substantially no pressure of any fluid that may enter the bore of the housing 80, as through leakage, and a passage 93 leading to the reservoir 12 is accordingly connected with said bore.

The centering mechanism includes a pair of washers or annular members 81 and 82 freely slidable upon a rod 83 which is of smaller diameter than that of the valve piston 150 to which it is securely attached as by the pin 84. A relatively light compression spring 85 is positioned between the two washers 81 and 82 and urges them toward the stops or seats 87 and 88 formed respectively by the end of the valve housing 125 and the reduced end portion of the bore of the housing 80. The arrangement is such that when the valve piston 150 is in its neutral position the washer 81 is in contact both with its seat 87 and with the adjacent end of the valve piston 150; and similarly, the washer 82 is then in contact with its seat 88 and is also in contact with the adjacent end of the auxiliary valve piston 154 which is carried by the rod 83 and is positioned with respect thereto by the nut 86 on the threaded end of said rod 83.

The washers 81 and 82 thus move toward each other, upon further compression of the spring 85, and one or the other of them is so moved whenever the valve piston 150 moves out of its neutral position. In other words, when the valve piston 150 moves toward the right of its neutral position the end of said valve piston 150 will move the washer 81 toward the right and away from its seat 88, the rod 83 sliding through the hole at the center of said washer 82. Similarly, when the valve piston 150 moves to the left of its neutral position, the end of the auxiliary valve piston 154 moves the washer 82 toward the left and away from its seat 88, the washer 81 remaining against its seat 87 as the rod 83 slides through the hole at its center. In this manner the centering mechanism tends to maintain the valve piston 150 in its neutral position and presents a relatively slight increased resistance to displacement of said valve piston in either direction.

The valve mechanism of Fig. 1 also includes an auxiliary valve bore formed in the auxiliary valve housing 90 and of the same diameter as the valve bore 126, into which the auxiliary valve piston 154 is slidably fitted. The auxiliary valve bore is thus equivalent to a continuation of the valve bore 126 and the auxiliary valve piston 154 is likewise equivalent to an additional head on the valve piston 150. The valve piston 150, rod 83 and auxiliary valve piston 154 may thus be said to comprise the valve piston assembly.

The left hand end of the valve piston 150 projects beyond the end of the valve housing 125 and into the bore of a housing 95 which is attached to the left hand end of the valve housing 125 by threaded engagement therewith. Also positioned in the bore of the housing 95 is a spring 34 having abutment pieces 35 and 96 respectively on each of its ends. The abutment piece 96 bears against the adjacent end of the valve piston 150 and the abutment piece 35 bears against the end of the screw 36 which extends through the closed end of the housing 95 and provides means for adjusting the compression of the spring 34. As will be readily understood, the spring 34 exerts a force upon the valve piston 150 tending to move the valve piston assembly toward the right as viewed in Fig. 1 and the abutment piece 96, which is of larger diameter than that of the valve bore 126, limits the maximum distance in this direction to which said valve piston assembly can be moved by said spring 34.

Position and movement of the valve piston assembly, by which the output of the pump 110 is regulated, are determined and effected by the actual drop existing across the metering orifice 40 relative to a predetermined pressure drop thereacross. The orifice 40 is here shown as positioned in the portion 15 of the discharge conduit and the end of the auxiliary valve housing 90 is accordingly connected, as by the passage 42, with said portion 15 of said discharge conduit at a point on the inlet side of said orifice 40. It has been found that when the metering orifice 40 is positioned at a point in the discharge conduit intermediate the driven member 14 and the reservoir 12 the pressure of the fluid on the outlet side of the orifice 40 is so small and subject to such minor variations that in practice it may frequently be neglected. In other words, the actual amount of the pressure existing on the inlet side of the orifice 40 may alone by practically employed in many instances as the measure of the pressure drop across said orifice and hence may be alone employed in measuring the rate of fluid flow therethrough. The outlet side of the orifice 40 is therefore not connected with the valve mechanism in the arrangement of Fig. 1. The force exerted upon the valve piston assembly by the action of the pressure fluid from the inlet side of the orifice 40 upon the end of the auxiliary valve piston 154 is thus opposed only by the force of the spring 34 when the valve mechanism is employed without viscosity compensating means. This arrangement has the obvious advantage of simplifying the structure and of reducing the necessary fluid connections.

With the pump 110 continuously driven, the valve mechanism of Fig. 1 functions to jointly control movement of the two adjusting pistons 120 whereby a definite output of said pump 110 is maintained for each adjustment or extent of opening of the variable metering orifice 40. This is accomplished through use of the pressure drop across the orifice 40, the pressure existing on the inlet side of said orifice 40 being alone employed for this purpose in the present instance as hereinbefore stated. The parts will remain in their neutral position as shown in Fig. 1 whenever the output of the pump 110 is such that it produces a pressure on the inlet side of the orifice 40 of such an amount that the force exerted thereby upon the auxiliary valve piston 154 equals the opposing force exerted by the spring 34. With the viscosity of the fluid considered constant or neglected, it will be understood that the pressure existing on the inlet side of the orifice 40 (for any setting or adjustment of said orifice 40 and of the compression of the spring 34) will depend entirely upon the rate of fluid flow therethrough and hence will depend entirely upon the output of the pump 110. It will also be understood that the valve piston assembly will remain in its neutral position as long as the output of the pump 110 remains constant at an amount producing the pressure on the inlet side of the orifice 40 required to balance the opposing force exerted by the spring 34.

Increase in the output of the pump 110, as because of increase in its speed or for any other reason, will produce an increase in the pressure existing on the inlet side of the orifice 40 which will be immediately communicated to the end of the bore in the auxiliary valve housing 90 where it will act upon the auxiliary valve piston 154, causing the valve piston assembly to move toward the left as viewed in Fig. 1. This movement of the valve piston assembly connects the cylinder port 127 with the portion of the valve bore 126 surrounding the reduced portion 156 of the valve piston; pressure fluid from the passage 58 is thus admitted to the outer ends of the adjusting cylinders 121, forcing the adjusting pistons 120 inward or in a delivery-decreasing direction and thereby reducing the output of the pump 110.

The pressure existing on the inlet side of the orifice 40 will decrease conformably with and immediately upon decrease in the output of the pump 110 responsive to the corrective action just described. Responsive to this decrease in pressure, the spring 34 will correspondingly and simultaneously move the valve piston assembly toward the right as viewed in Fig. 1. Decrease in the output of the pump 110 accompanied by corresponding movement of the valve piston assembly toward the right, will continue until the delivered volume is reduced to the exact amount producing the pressure on the inlet side of the orifice 40 as established by the spring 34, when the valve piston assembly will be restored to its neutral position and will again render the adjusting pistons 120 inoperative.

The operation of the mechanism is, of course, the reverse of that above explained when the output of the pump 110 is for any reason decreased below the amount at which the corresponding pressure existing on the inlet side of the orifice 40 balances the force exerted upon the valve piston assembly in its neutral position by the spring 34.

These corrective changes in the pump's output and restoring movements of valve piston assembly and the adjusting pistons 120 take place almost instantaneously, and the adjustments are such as to set the corrective mechanisms into operation upon slight departures from the output to be maintained.

From the foregoing it will be understood that there is only one rate of fluid flow through the orifice 40 (viscosity being neglected or considered as constant) that will produce a predetermined amount of pressure on the inlet side of the orifice 40 for any adjustment or extent of opening thereof, and hence there is only one output of the pump 110 which meets this requirement. It will therefore be seen that the control mechanism of Fig. 1 functions to so control joint operation of the two adjusting pistons 120 that a predetermined output of the pump 110 is maintained for each particular setting or adjustment of the spring 34 and of the orifice 40, the actual output of the pump 110 being instantaneously altered to correct for any variations from this predetermined output. The output of the pump 110 is thus held substantially constant regardless of variations in operating conditions as long as the setting or adjustment of the spring 34 and of the orifice 40 remain unchanged. Moreover, this holds true for any adjustment of the orifice 40 to control the motor 14, and there is an instant response to any such adjustment to change the pump's delivery accordingly which changed delivery is then maintained constant until a further variation in the size or extent of opening of the orifice 40 is made.

In the foregoing explanation the viscosity of the circulated fluid has been neglected or considered as constant. In practice, however, the viscosity of the fluid (usually oil) will change over a relatively wide range upon change in the temperature of the fluid and will noticeably affect the pressure on the inlet side of the orifice 40 resulting from a constant rate of fluid flow therethrough for any particular adjustment of extent of opening of the orifice 40. This change in pressure on the inlet side of the orifice 40, due to viscosity change, will in turn affect the output of the pump 110 unless compensation therefor is provided. Fig. 1 therefore also illustrates viscosity compensating mechanism for this purpose.

The viscosity compensating mechanism includes a constant capacity pump 67 receiving its fluid supply through an inlet conduit 68 connected with the inlet conduit 11 which leads to the pump 110, so that fluid of the same viscosity is supplied to both of these pumps. The pump 67 is also provided with a discharge conduit 69 leading to the reservoir 12 and having a metering orifice 70. Fluid from the inlet side of the orifice 70 is admitted, as through the passage 65, to the bore of the housing 95, which also serves as a compensating cylinder, where it acts, through the abutment piece 96, upon the exposed end of the valve piston 150 and thus supplements the force exerted by the spring 34. As in the case of the fluid pressure on the outlet side of the orifice 40, it has likewise been found that the pressure on the outlet side of the orifice 70 may be neglected for most practical purposes. The pressure existing on the inlet side of the orifice 70 is accordingly alone employed as the measure of the pressure drop thereacross and the valve piston assembly is therefore not acted upon by fluid from the outlet side of said orifice 70.

Pressure existing on the inlet side of the orifice 70 will vary conformably with change in the viscosity of the circulated fluid. Compensation for viscosity change is thus effected by variation in the supplementary force upon the valve piston 150 exerted by the pressure fluid in the bore of the housing 95, the pressure of this fluid varying substantially with the pressure drop across the orifice 70 and substantially with the change in viscosity of the fluid as already stated. In this manner the amount of pressure to be maintained across the orifice 40 (which is determined by the spring 34 alone when viscosity compensating mechanism is not employed) is modified substantially in accordance with the effect of the change in viscosity of the fluid upon the pressure drop across the orifice 40 caused by a constant rate of fluid flow therethrough, so that the output of the pump 110 is unaffected by change in the viscosity of the circulated fluid.

The output of the pump 110 is preferably regulated by varying the adjustment or extent of opening of the variable orifice 40, the adjustment or variation in the extent of its opening being effected by any preferred means, such, for example, as the manually operated means 41 schematically shown. In this manner the pump's output may be infinitely varied from maximum, when the orifice 40 is fully open, to a minimum such as zero when the orifice 40 is fully closed.

The valve mechanism of Fig. 1 thus functions to accurately control the output of the pump 110, comprising the combined outputs of its two pumping sections, throughout the entire range from maximum to minimum. This valve mechanism is also adapted, however, to function as a relief valve to permit escape of fluid from the discharge conduit, as for example when the output of the pump 110 has been reduced to minimum and there is excess pressure and this feature will now be explained.

As already explained, the output of the pump 110 is regulated by varying the adjustment or extent of opening of the variable orifice 40, and the output of said pump 110 is progressively decreased as the extent of opening of said orifice 40 is progressively reduced. When the orifice 40 is completely closed the output of the pump 110 is immediately reduced to minimum, this action taking place as the valve piston assembly is moved to the left of its neutral position and admits pressure fluid to the outer ends of the adjusting cylinders 121 so that the adjusting pistons 120 are immediately moved to their extreme inward positions, as against suitable stops, not shown.

Complete closure of the orifice 40 prevents the passage of any fluid therethrough so that there will be an immediate increase in the pressure of the fluid in the portion 15 of the discharge conduit if the pump 110 continues to deliver any fluid whatsoever. This increase in pressure will be immediately transmitted to the auxiliary valve bore and the corresponding force exerted upon the auxiliary valve piston 154 will immediately move the valve piston assembly still farther toward the left until the head 152 has reached the point where the exhaust passage 29 is connected with the portion of the valve bore 126 surrounding the reduced portion 156 of the valve piston. The arrangement is made such that, when the valve piston assembly is displaced to this extent, fluid connection is established between the exhaust passage 29 and the point of admission of pressure fluid into the valve bore 126 from the passage 58; that is to say, the reduced portion 156 of the valve piston is made of a length equal to or slightly greater than the distance separating the exhaust passage 29 and the point of admission of pressure fluid into the valve bore 126. With the parts in this displaced position it will be seen that pressure fluid from the portion 13 of the discharge conduit may pass through the passage 58, into the valve bore 126 around the reduced portion 156 of the valve piston, and out through the exhaust passage 29. It will also be observed that exhaust, and hence reduction in pressure of the fluid, takes place as the fluid passes into the exhaust port 29' of the passage 29; that is to say, the exhaust with its accompanying drop in pressure takes place at a point beyond and removed from the annular cylinder port 127. Pressure is thus maintained in the cylinder port 127 and in the outer ends of the adjusting cylinders 121 when the valve mechanism is functioning as a relief valve; in practice it has been found that this maintained pressure is sufficient to continuously hold the adjusting pistons 120 in their extreme inward positions so that the output of the pump 110 is kept at minimum and there is no "surging" action. In this connection it may be noted that the adjusting pistons 120 are preferably made relatively large in order to provide ample force to readily and instantly move the adjusting rods 117 in an inward direction, even at relatively low pressures of the fluid in the outer ends of the adjusting cylinders 121 and at low pump pressures (in the discharge conduit 13). With this preferred arrangement the pressure required to move the adjusting pistons 120 inward, or to hold them in their extreme inward position, is only a fraction of the pressure existing in the pump's discharge conduit, so that said adjusting pistons 120 will be held in their extreme inward position while relief valve action is taking place even if the pressure of the fluid in the adjusting cylinders 121 should fall somewhat below pump pressure incident to this relief valve action.

It is desirable to limit the maximum distance through which the valve piston assembly can be moved toward the left by action of pressure fluid upon the auxiliary valve piston 154 in order to prevent closure of the fluid connection between the valve bore 126 and the passage 58. In the present instance the washers 81 and 82 of the centering mechanism are also used as stops and the proportions are made such that the washer 82 strikes the washer 81, preventing further movement of the parts toward the left, when the valve piston assembly has moved into a position at which fluid connection is fully established between the exhaust passage 29 and the point of admission of pressure fluid from the passage 58 into the valve bore 126.

The relief valve feature of the present invention has many advantages. For example, its structure is simple and it can be embodied in the control valve mechanism with little or no added cost. It is positive in action yet functions only when the pump output is reduced to minimum; in the case of the valve mechanism of Fig. 1 it permits exhaust or relief of fluid at lower pressure than would be practical if a separate relief valve were employed.

This relief valve feature further makes it unnecessary to provide absolute zero output of the pump and hence makes it unnecessary to resort to the extreme precision in manufacture or adjustment, or in both, required to provide a minimum output which is absolutely zero. This greatly reduces the pump cost.

Another and very important advantage of this feature is that it makes it possible to completely cut off communication between the pump 110 and the fluid motor 14 when it is desired to stop the operation of the latter whereby all movement of the motor 14, due to any fluid output of the pump 110, is entirely prevented. It will be noted in this connection that with the arrangement of Fig. 1 no movement of the fluid motor 14 occurs during exhaust of fluid and, in fact, the only possible movement of the motor 14 is the slight amount corresponding to the volume of fluid necessary to move the valve piston assembly to its "relief" or exhaust position, and this is negligible.

Figure 2:
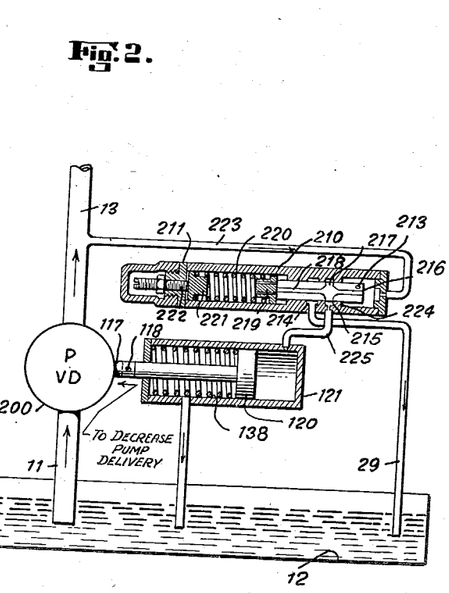
Fig. 2 is a diagrammatic view illustrating a portion of another fluid pressure system which includes a modified form of the present invention in valve mechanism which automatically varies the pump's output to hold pump discharge pressure substantially constant at a predetermined value and in addition provides relief valve action.

As already stated, the invention may be embodied in connection with numerous types of valve mechanisms adapted to control the output of the variable delivery pump, such, for example, as shown in Fig. 2 in which the valve mechanism illustrated functions responsive to pressure in the discharge conduit to so alter the output of the pump that the pressure in said discharge conduit is held substantially constant at a predetermined value.

In this instance a "single" variable output pumping unit 200 (Fig. 2) is illustrated, that is to say, the pump 200 is of the type having a single pumping section. Fluid is supplied to the pump 200 through the inlet conduit 11 and pressure fluid is delivered by said pump into the discharge conduit 13.

The pump 200 is provided with an adjusting rod 117 attached, as at 118, to an adjusting piston 120 which is reciprocable in an adjusting cylinder 121. These parts are identical in structure and operation with the correspondingly numbered parts of each of the two pumping sections of the double pump 110 of Fig. 1 and the arrangement is such that inward movement of the adjusting rod 117 and adjusting piston 120 cause decrease in the output of the pump 200 and vice versa.

The outer end of the adjusting cylinder 121 of Fig. 2 is connected as by a passage 225 with an annular cylinder port 215 in the bore of the valve housing 210. Admission of fluid to an exhaust of fluid from the cylinder port 215, and hence from the outer end of the adjusting cylinder 121, are regulated by a head 217 of the valve piston 216 which is slidably fitted within the valve bore. The arrangement is such that the head 217 closes the cylinder port 215 and cuts off communication between said cylinder port 215 and the valve bore when the valve piston 216 is in its neutral position in which it is shown in Fig. 2. Movement of the valve piston 216 to the left of its neutral position admits pressure fluid from the discharge conduit 13 to the cylinder port 215 and to the outer end of the adjusting cylinder 121, thus causing the adjusting piston 120 to move inward to reduce the pump's output; pressure fluid from the discharge conduit 13 is supplied continuously to the enlarged right hand end of the valve bore through a passage 223 and passes along the recesses intermediate those guiding surfaces 218 which extend axially from the head 217 to the right hand end of the valve piston 216. When the valve piston 216 is moved to the right of its neutral position, fluid may pass out from the outer end of the adjusting cylinder 121 into the cylinder port 215 and thence along the recesses intermediate the guiding surfaces 218 on the left end of the valve piston and into the annular exhaust port 214 which is suitably connected with the reservoir as by the passage 29; upon such exhaust of fluid from the outer end of the adjusting cylinder 121, the adjusting piston 120 moves outward under the influence of the spring 136 and thus causes increase in the pump's output.

Movement of the valve piston 216 takes place responsive to change in pressure of the fluid in the discharge conduit and its position in the valve bore is determined by the pressure in said discharge conduit relative to a predetermined pressure value therein. This is accomplished through the action of the pressure fluid in the enlarged right hand end of the valve bore upon the right hand end of the valve piston 216 which tends to move said valve piston toward the left in opposition to the force exerted upon the valve piston 216 by the spring 220, through the intermediate abutment piece 219, which tends to move the valve piston 216 toward the right. It will thus be seen that the valve piston 216 occupies its neutral position, in which it is shown and in which it closes the cylinder port 215, only when the fluid pressure in the discharge conduit 13 has a definite value determined by the spring 220, the compression of which may be adjusted by means of the screw 222 which extends through the end cover 211 of the valve housing 210 and the inner end of which bears against an abutment piece 221 intermediate the screw's inner end and the spring 220. It will also be understood that increase in pressure of the fluid in the discharge conduit 13 above the value determined by the spring 220 will increase the fluid-exerted force urging the valve piston 216 toward the left, so that said valve piston will be displaced to the left of its neutral position, causing the adjusting piston 120 to move inward to decrease the pump's output. Conversely, decrease in pressure of the fluid in the discharge conduit 13 below the value determined by the spring 220 will decrease the fluid-exerted force active in opposition to the force exerted by said spring 220 and said spring will immediately displace the valve piston 216 to the right of its neutral position, permitting exhaust of fluid from the outer end of the adjusting cylinder 121, whereby the adjusting piston 120 will be moved outward or in a delivery-increasing direction. In either case, the valve piston 216 will be restored to its neutral position and movement of the adjusting piston 120 will cease upon re-establishment of the predetermined pressure value in the discharge conduit 13, as will frequently result from corrective change in the pump's output.

In this manner the valve piston 216 is automatically moved, responsive to change in pressure of the fluid in the discharge conduit, to so regulate admission and exhaust of fluid to and from the outer end of the adjusting cylinder 121 that the output of the pump is automatically altered within its capacity range, to provide a delivered volume at which the pressure of the fluid in the discharge conduit is held substantially constant at a predetermined value.

It is possible, however, that the fluid in the discharge conduit 13 may not be restored to the pre-determined pressure value by corrective change in the pump's output and the pressure in said discharge conduit may continue to exceed the pressure value as determined by the spring 220 even when the output of the pump 200 has been reduced to minimum; for instance, such a condition would result if the minimum output of the pump is not absolutely zero and if escape of fluid from the discharge conduit 13 is entirely prevented, as by closure of a valve. Under these conditions the valve piston 216 will be moved toward the left until its head 217 has reached the point where the exhaust port 214 is connected with the axial recesses intermediate the guiding surfaces 218 which extend from said head 217 to the right hand end of the valve piston 216. Fluid connection is thus established between the exhaust passage 29 and the enlarged right hand end of the valve bore, permitting escape of fluid from the discharge conduit 13. As in the embodiment of Fig. 1, pressure is maintained in the cylinder port 215 and in the outer end of the adjusting cylinder 121 so that the adjusting piston 120 is kept in its extreme inward position and the output of the pump 200 is kept at minimum while this relief valve action is taking place. The valve piston 216 is automatically returned to its normal operating position upon corresponding decrease in the pressure of the fluid in the discharge conduit 13. The maximum distance to which the valve piston 216 can be moved toward the left is limited by a suitable stop or pin 213 carried by the valve piston and adapted to engage the shoulder 224 formed by the inner wall of the enlarged right hand end of the valve bore. The abutment piece 219, which is of a diameter larger than that of the valve bore, similarly limits the maximum distance toward the right to which the valve piston 216 can be moved by the spring 220.

Relief valve action thus takes place automatically whenever the pressure in the discharge conduit 13 exceeds the predetermined pressure by an amount sufficient to displace the valve piston toward the left to the point where relief or exhaust connection is established between the enlarged right hand end of the valve bore and the exhaust cylinder 214, but this relief valve action takes place only after fluid connections have been established to reduce the pump's output to minimum. The arrangement of Fig. 2 therefore provides relief valve action at a pressure greater than but related to whatever pressure value is to be maintained in the discharge conduit 13 and adjustment of the compression of the spring 220 alters the pressure at which relief valve action takes place simultaneously with change in the pressure value to be maintained.

Figure 3:
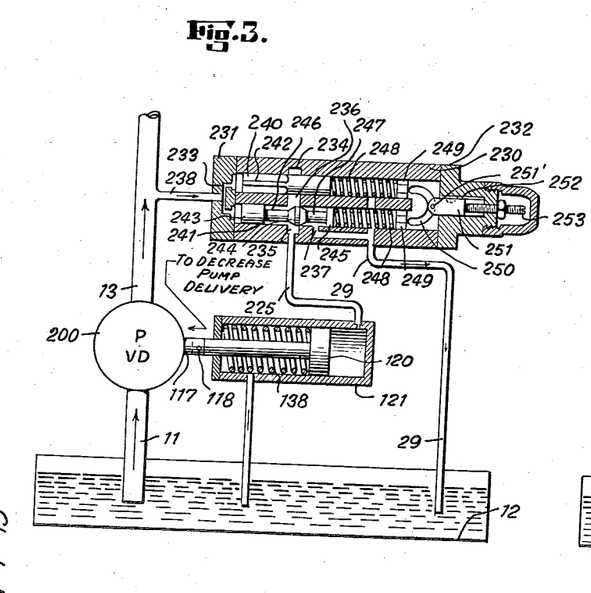
Fig. 3 diagrammatically illustrates a fluid pressure system similar to that of Fig. 2 but including a modified form of valve mechanism which functions in a manner generally similar to that of the valve mechanism of Fig. 2.

In the modified form of the "constant pressure control" of Fig. 3 two valve pistons 240 and 241 of equal diameters are slidably fitted within two separate parallel valve bores formed in the valve housing 230. The two valve bores are provided with annular cylinder ports 234 and 235 respectively which are positioned in the same plane transverse the axis of said valve bores and which are suitably inter-connected as by the passage 236. The cylinder port 235 is likewise connected with the passage 225 which leads to and connects with the outer end of the adjusting cylinder 121 of the pump 200, said adjusting cylinder 121 and its associated parts and said pump 200 being identical with corresponding parts as shown in Fig. 2.

The left hand ends of both valve bores are supplied with pressure fluid from the discharge conduit 13, as by the passage 238 leading from said discharge conduit 13 to the branched passage 233 in the end cover 231. The left hand ends of both valve pistons 240 and 241 are thus exposed to fluid having substantially the same pressure as that in the discharge conduit 13 and the force exerted upon them by the pressure fluid is opposed by the force of a pair of identical springs 248, one of which is positioned in the right hand end of each valve bore and abuts against the adjacent end of its corresponding valve piston. The other ends of the springs 248 bear against abutment pieces 249 which in turn bear against the ends of a forked member 250 positioned in the enlarged end bore of the valve housing 230 and pivotally mounted at 251' upon the inner end of a short plunger or rod 251. The rod 251 is slidably supported in an appropriate bore in the end cover 232 and is held against rotation as by a key 252 slidable in an appropriate keyway. The outer end of the rod 251 bears against the inner end of a screw 253 extending through the end cover 232. With this arrangement the compression of the two springs 248 may be simultaneously and equally adjusted by means of the single screw 253, so that both valve pistons 240 and 241 will move substantially equally and simultaneously responsive to changes in fluid pressure existing in the discharge conduit 13 and in the left hand ends of the valve bores.

The valve piston 240 controls the admission of pressure fluid to the interconnected cylinder ports 234 and 235 and hence controls admission of pressure fluid to the outer end of the adjusting cylinder 121. It is accordingly formed with a plurality of recesses for the passage of fluid which are positioned circumferentially intermediate its guiding surfaces 242 and which are so arranged that hydraulic forces acting in a radial direction upon this portion of the valve piston 240 are balanced. The recesses extend from the left hand end of the valve piston 240 for an equal distance toward the right so that their tapered inner ends terminate in a plane transverse the axis of said valve piston 240 and are thus equivalent to a shoulder or head provided with V-notches in the well known manner. The arrangement is such that when the valve piston 240 is in its neutral position, in which it is shown in Fig. 3, the tapered ends of the recesses occupy a position just sufficiently to the left of the cylinder port 234 to cut off fluid communication between said recesses and said cylinder port. It will be observed from inspection of Fig. 3 that this cut off of communication between the recesses and the cylinder port 234 is unaffected by movement of the valve piston to the left of its neutral position. Movement of the valve piston 240 out of its neutral position and toward the right, however, connects the recesses with the cylinder port 234, thus admitting pressure fluid thereto.

The valve piston 241 controls emission or exhaust of all fluid from the valve housing 230 and comprises three heads 243, 244 and 245 respectively which are separated by reduced portions 246 and 247. When the valve piston 241 is in its neutral position, in which it is shown in Fig. 3, the head 244 occupies a position just sufficiently toward the right to cut off fluid communication between the cylinder port 235 and the reduced portion 247 of said valve piston. Movement of the valve piston 241 out of its neutral position and toward the left establishes communication between the cylinder port 235 and the reduced portion 247 of the valve piston and when the valve piston is in this position fluid may pass from the cylinder port 235, around the reduced portion 247 and out through the exhaust port 237 into the passage 29 leading to the reservoir 12. Movement of the valve piston out of its neutral position and toward the right has no effect, initially, upon the fluid connections of the cylinder port 235 but its further movement toward the right connects both said cylinder port 235 and the exhaust port 237 with the reduced portion 246 of said valve piston, providing relief valve action as will be more fully explained. The right hand ends of both valve bores are also connected with the exhaust passage 29 in order to prevent the right hand ends of said valve bores from being filled with fluid due to any leakage that may take place past the valve pistons 240 and 241.

In operation, the valve mechanism of Fig. 3 functions both to provide relief valve action and to so regulate and control the output of the pump 200 that the pressure in the discharge conduit 13 is held substantially constant at a pressure determined by the springs 248. Both valve pistons 240 and 241 will remain in their neutral positions as long as the predetermined pressure exists in the discharge conduit and in the left hand end of the valve bores, and the output of the pump 200 will, of course, remain unchanged as long as this condition exists. Upon decrease in pressure below the predetermined value, both valve pistons 240 and 241 will be substantially simultaneously and equally moved toward the left by the springs 248; fluid may then pass out of the outer end of the adjusting cylinder 121, permitting the adjusting piston 120 to move in an outward or delivery-increasing direction so that the output of the pump 200 is increased. Upon increase in pressure above the predetermined value, both valve pistons 240 and 241 will move substantially simultaneously and equally toward the right; pressure fluid will then be admitted to the outer end of the adjusting cylinder 121, causing the adjusting piston 120 to move in an inward or delivery-decreasing direction, thus reducing the output of the pump 200.

Both valve pistons 240 and 241 will be restored to their neutral positions responsive to restoration of the predetermined pressure value in the discharge conduit 13, as will result from corrective change in the output of the pump 200 whenever said pressure value can be produced by an output within the range of the pump's minimum and maximum outputs. As in the case of the embodiment of Fig. 2, the output of the pump 200 will, however, be increased to maximum or decreased to minimum if the pressure in the discharge conduit 13 is not restored to the predetermined value by an intermediate output of the pump. The output of the pump 200 is thus automatically varied to hold the pressure in the discharge conduit 13 substantially constant at the predetermined value, within the limits to which this pressure can be produced by any output of the pump from maximum to minimum.

Relief valve action takes place automatically if excess pressure continues to exist in the discharge conduit after the valve pistons 240 and 241 have moved to admit pressure fluid to the outer end of the adjusting cylinder 121 to thereby reduce the output of the pump to minimum. Upon such continuing excess, both valve pistons 240 and 241 will be displaced toward the right until the head 244 of the valve piston 241 establishes the exhaust connection with the exhaust port 237. Fluid may then pass out through the recesses of the valve piston 240 and the intervening ports and passages into the exhaust passage 29.

The pressure value to be maintained in the discharge conduit 13 may be altered by adjusting the compression of the springs 248 by means of the screw 253. Such adjustment also alters the pressure at which relief valve action takes place, the pressure value of which is related to but greater than the pressure value to be maintained and at which fluid connection is established to reduce the pump's output to minimum.

Figure 4:
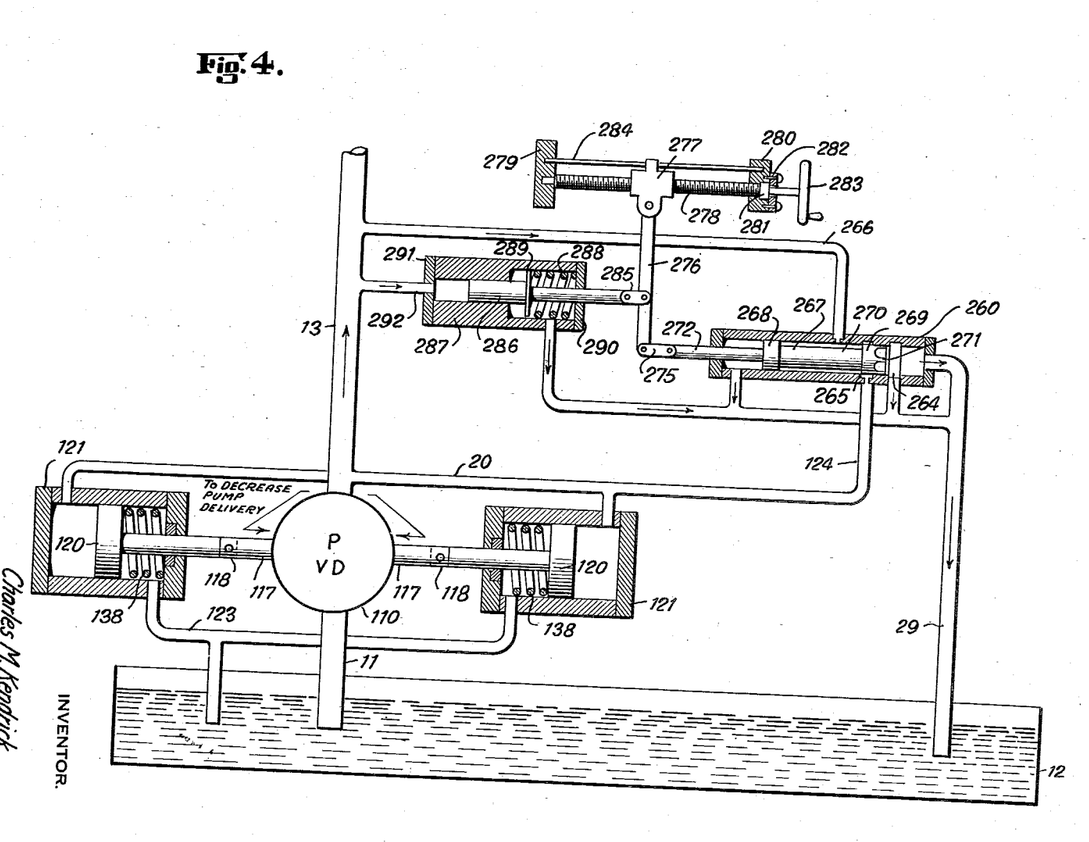
Fig. 4 diagrammatically illustrates another fluid pressure system which includes another modified form of combined control and relief valve mechanism active to control the output of the pump in a manner generally similar to that of the valve mechanism of Figs. 2 and 3, and Fig. 5 diagrammatically illustrates another embodiment of the invention.

Fig. 4 schematically illustrates a further modified form of "constant pressure control" which is shown in connection with a double pump 110 (identical with the double pump 110 of Fig. 1) although it will be understood that it may likewise be employed with single pumping units.

The valve mechanism of Fig. 4 includes a valve housing 260 in the valve bore of which a valve piston 267 is slidably fitted. The valve piston 267 includes two beads 268 and 269 respectively which are separated by a reduced portion 270; short guiding surfaces 271 extend from one end of the head 269 in order to guide and support said head 269 as it passes across the ports in the valve bore. The arrangement is such that the head 269 cuts off communication between the valve bore and the annular cylinder port 265 when the valve piston 267 occupies its neutral position in which it is shown in Fig. 4. Movement of the valve piston 267 to the left of its neutral position connects the cylinder post 265 with the left hand end of the valve bore, permitting escape of fluid from said cylinder port 265 through the emission or exhaust port 264 which is appropriately connected with the exhaust passage 29. Movement of the valve piston 267 to the right of its neutral position connects the cylinder port 265 with the portion of the valve bore surrounding the valve piston's reduced portion 270 so that said cylinder port is thus connected with the supply of pressure fluid admitted to said valve bore as by the passage 266 which connects with the discharge conduit 13. Upon movement farther toward the right from the neutral position, the reduced portion 270 will also be connected with the exhaust port 264, thus providing relief valve action. The portions of the valve bore on both ends of the valve piston 267 are also suitably connected with the exhaust passage 29 as shown in Fig. 4 in order to assure free movement of the valve piston 267 at all times.

The cylinder port 265 is connected with the passage 124 leading to the communicating passage 20 which connects the outer ends of the two adjusting cylinders 121 which together with their associated parts are identical with corresponding parts of the embodiment of Fig. 1.

The valve piston is moved by means of a rod 272 extending from the head 268 and projecting through a suitable opening in the end cover 261 of the valve housing 260. The outer end of the rod 272 is pivotally connected with one end of a short link 275, the other end of which is pivotally connected with the lower end of a floating lever 276. The upper end of the floating lever 276 is pivotally connected with a manually adjustable member 277, here shown as provided with a suitably threaded bore through which a screw 278 extends. The screw 278 is rotatably mounted as upon supporting means 279 and 280 which are schematically shown but said screw 278 is held against axial movement by a shoulder 281 which is kept in place in an appropriate recess in the supporting means 280 as by a suitably fastened collar 282. The screw 278 is adapted to be rotated by a hand-wheel 283 which is attached to the end of said screw 278 projecting from its shoulder 281. The member 277 is held against rotation by a rod 284 passing through an appropriate opening in the upper extending portion of said member 277 and said rod 284 is supported by the supporting means 279 and 280. It will thus be seen that rotation of the hand-wheel 283 will cause the member 277 to move axially along the screw 278 so that said member 277 may be moved to any point intermediate the supporting means 279 and 280.

The floating lever 276 is also pivotally connected at a point intermediate its ends with a short link 285, the other end of which is pivotally connected to the piston rod of a piston 286 reciprocable in a cylinder 287. The piston rod end of the piston 286 of the cylinder member contains a compression spring 288, one end of which bears against an abutment piece 289 carried by the piston rod and the other end of which bears against the end cover 290 of the cylinder 287. The other end of the cylinder 287 is closed by the end cover 291 and is connected as by the passage 292 with the discharge conduit 13.

In operation, the control mechanism of Fig. 4 functions both to provide relief valve action and to so control and regulate the output of the pump 110 that the pressure in the discharge conduit 13 is maintained substantially constant at a value determined by the spring 288 and by the position of the member 277 intermediate the supporting means 279 and 280. The parts will remain in the neutral position shown in Fig. 4 as long as the predetermined pressure value exists in the discharge conduit 13, the output of the pump 110 remaining unchanged whenever this condition obtains.

If the pressure in the discharge conduit 13 falls below the predetermined value, the spring 288 will move the piston 286 and its piston rod toward the left, causing the floating lever 276 to swing about its pivot on the member 277 and thus moving the valve piston 267 out of its neutral position and toward the left. As already explained, this movement of the valve piston 267 connects the cylinder port 265 with the exhaust port 264 so that fluid may pass out of the outer ends of the adjusting cylinders 121 as the adjusting pistons 120 move in an outward or delivery-increasing direction, thus increasing the output of the pump 110. The parts will be restored to their neutral position as shown in Fig. 4 upon re-establishment of the predetermined pressure value in the discharge conduit 13, as will usually result from increase in the pump's output. The output of the pump 110 will, however, immediately be increased to maximum if the predetermined pressure value is not restored by an intermediate output.

Increase of the pressure in the discharge conduit 13 above the predetermined value will cause the piston 286 to move toward the right against the resistance of the spring 288 and will cause the floating lever 276 to swing about its pivot on the member 277, thus moving the valve piston 267 out of its neutral position and toward the right. As already explained, this movement of the valve piston 267 admits pressure fluid to the outer ends of the adjusting cylinders 121 and causes the adjusting pistons 120 to move in an inward or delivery-decreasing direction so that the output of the pump 110 is reduced. In many instances the pressure in the discharge conduit 13 will be restored to the predetermined value responsive to decrease in the pump's output to an amount intermediate its maximum and minimum outputs, and upon such restoration the parts will be restored to their neutral position. The output of the pump 110 will be immediately decreased to minimum, however, if the pressure in the discharge conduit 13 continues to exceed the predetermined value at intermediate outputs. Relief valve action takes place automatically if excess pressure continues to exist at minimum pump output in such an amount that the piston 286 is moved farther toward the right a distance sufficient to cause the corresponding movement of the valve piston 267 to establish fluid connection between the reduced portion 270 thereof and the exhaust passage 264.

The amount of fluid admitted to and exhausted from the outer ends of the adjusting cylinders 121, through the communicating passage 20 and the passage 124, is thus automatically controlled to so vary the output of the pump 110 that the pressure in the discharge conduit 13 is held substantially constant at the predetermined value, within the limits, of course, to which this pressure can be produced by any output of the pump from maximum to minimum. The amount of pressure to be maintained in the discharge conduit 13 may be readily adjusted or varied by rotating the handwheel 283 to change the position of the member 277; movement of the member 277 toward the left decreases the pressure value to be maintained and vice versa. As in previously described embodiments, adjustment which changes the amount of pressure to be maintained also changes the pressure at which relief valve action takes place, the latter always being at a pressure related to but greater than the pressure to be maintained and at which fluid connection is established to reduce the pump's output to minimum.

Figure 5:
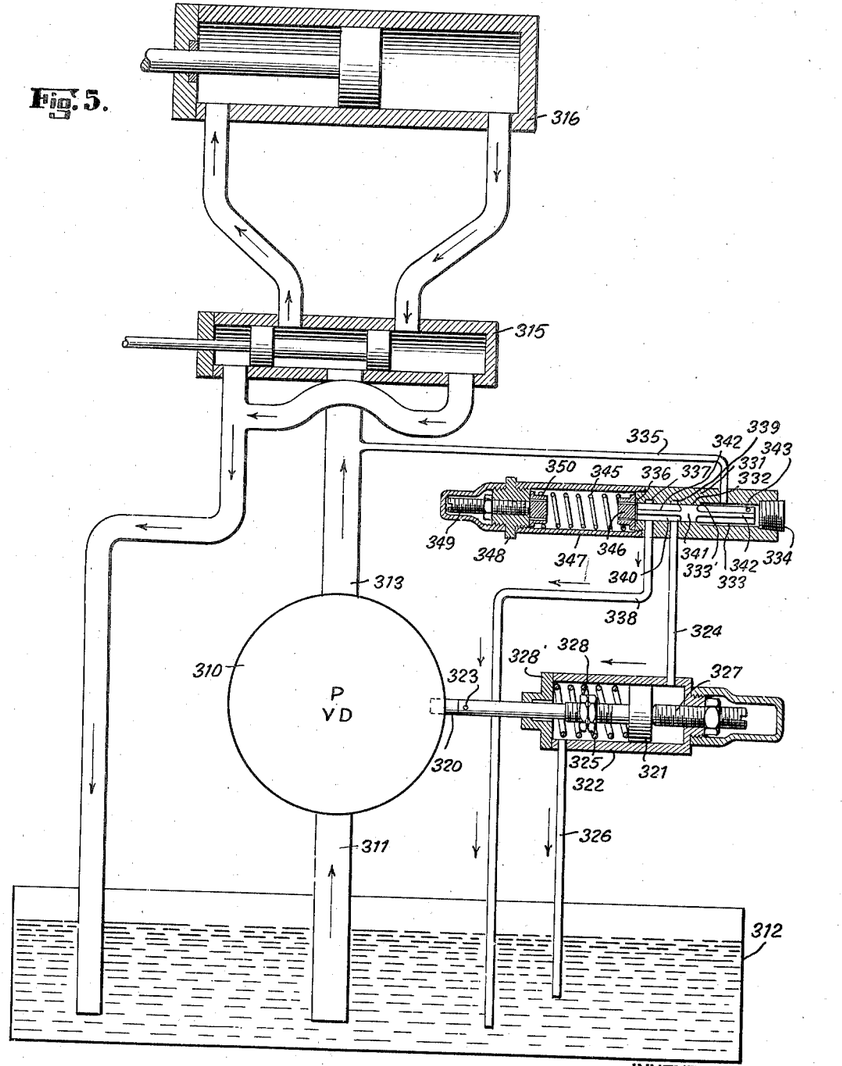

In the embodiment of Fig. 5 the invention is illustrated as embodied in a fluid pressure feed and rapid traverse system of transmission of power of the character set forth in my application Serial No. 189,362, filed February 8, 1938. In this system a single variable delivery pump 310 is the fluid pressure source and is provided with a two point variable delivery mechanism 320, 322, one point for delivery at the full adjusted delivery and low pressure, and the other point at the low adjusted delivery and high pressure. There is here no regulation or maintenance of pressures, the latter being permitted to vary considerably without any effort to regulate the same.

The variable delivery pump 310 receives its supply of fluid through an inlet conduit 311, from a reservoir 312. The pump 310 is also provided with a discharge conduit 313 leading to and connecting with a directional valve 315 of conventional type which controls the direction of operation of the power cylinder 316.

The volume of fluid delivered by the pump 310 is controlled by the position of a laterally movable adjusting rod or volume determining element 320. The arrangement is such that movement of the adjusting rod 320 inward (or toward the left as viewed in Fig. 5) causes decrease in the delivered volume, while its movement outward (or toward the right) causes increase of the volume of fluid delivered.

Movement of the adjusting rod 320 is effected and its position controlled by power means in cooperation with control valve mechanism. In the embodiment here chosen for illustration, the power means is a fluid motor which includes an adjusting piston 321 reciprocable in an adjusting cylinder 322 and appropriately connected with the adjusting rod 320, as indicated at 323, for simultaneous movement therewith. The adjusting piston 321 is moved inward or in a delivery decreasing direction by pressure fluid admitted to the right hand end of the adjusting cylinder 322 through the pipe 324 but is preferably moved outward or in a delivery increasing direction by a spring 325. Movement of the adjusting piston 321, and hence its position, is entirely controlled by admission and exhaust of fluid to and from the right hand end of the adjusting cylinder 322, thus simplifying the fluid circuit and the necessary control mechanism as will be more fully explained presently. A return pipe 326 leads from the left hand end of the adjusting cylinder 322 to the reservoir 312 to permit the passage of any fluid leaking past the adjusting piston 321 from the right hand end of the adjusting cylinder 322.

Suitable means are also provided to determine the maximum and the minimum fluid volumes to be delivered by the pump 310. In the present instance these delivery determining means are shown as adjustable stops 327 and 328 respectively for the adjusting piston 321. The stop 327 limits the movement of the adjusting piston 321 and its attached adjusting rod 320 in an outward or delivery increasing direction and hence determines the maximum fluid volume delivered by the pump 310; it is accordingly set so that the maximum volume thus determined is the volume required for rapid traverse. Similarly, the stop 328 limits movement of the adjusting piston 321 and adjusting rod 320 in an inward or delivery decreasing direction and hence determines the minimum fluid volume which the pump 310 delivers; it is therefore set so that the minimum volume thus determined is the volume desired for feed or slow traverse. This stop 328 comprises a pair of adjustable nuts on a screw threaded part of the piston rod, and the movement of the piston and rod to the left is limited by the stop 328 engaging with the end wall 328', of the cylinder.

Admission and exhaust of fluid to and from the adjusting cylinder 322 through the pipe 324 are under control of control valve mechanism which includes a valve housing 331 in which is a valve bore 332 having an enlarged end 333 (for convenience hereinafter termed the "high pressure" end). The latter is connected as by a pipe 335 with the discharge conduit 313 from which it receives a supply of fluid under substantially the same pressure as that in said discharge conduit 313. The other end of the valve bore 332 (which for convenience will be hereinafter termed the "exhaust end") is connected with the reservoir 312 by means of an annular exhaust port 337 and a pipe 338. An annular cylinder port 339 is also formed in the valve bore 332 intermediate the ends thereof and is suitably connected with the pipe 324, whose other end is connected with the right hand end of the adjusting cylinder 322 as already stated.

A valve piston 340 is slidably mounted in the valve bore 332 and is made of such length that one of its ends at all times extends into the high pressure end 333 of the valve bore 332. The proportions are also such that the other end of the valve piston 340 is even with the exhaust end of the valve housing 331 when said piston 340 is in its extreme working position toward the right, as shown in Fig. 5. The piston 340 is formed intermediate its ends with a single valve head 341, somewhat elongated, which effectively cuts off communication between the portions of the valve bore 332 on either end thereof. In order to firmly guide the valve piston 340 and to prevent binding, a plurality of guiding surfaces 342 extend from the head 341 to the ends of the valve piston 340, suitable recesses being formed circumferentially between the guiding surfaces 342 to permit the passage of fluid. The guiding surfaces 342 and intermediate recesses are so arranged that the hydraulic forces acting in a radial direction on the valve piston 340 at any point are balanced, in the usual manner.

The end of the valve piston 340 which lies in the high pressure end 333 of the valve bore 332 is acted upon by pressure fluid therein which tends to move the valve piston 340 toward the left, as viewed in the drawing. Maximum movement of the valve piston 340 in this direction is limited by a stop 343, comprising a pin driven through said valve piston 340 near its end, which is adapted to strike the shoulder 333′ formed by the inner end of the enlarged portion 333 of the valve bore 332. The arrangement is made such that the stop 343 does not strike this shoulder until the valve piston 340 has moved a distance toward the left sufficient not only to connect the cylinder port 339 with the high pressure end 333 of the valve bore 332 but also to permit overrun of the valve head 341 a short distance (for example, 1/16″) beyond the exhaust port 337.

The force acting on the valve piston 340 in a direction tending to move it toward the left is opposed by a force exerted by a spring 345 acting on the opposite end of the valve piston 340, that is the end thereof which is in the exhaust end of the valve bore 332, and urging it toward the right. The force of the spring 345 is transmitted to the end of the valve piston 340 by means of an intermediate end piece 346 of greater diameter than a counter-bore 336, which is formed on the end of housing 331; so that the adjacent end of the valve housing 331 acts as a stop for the end piece 346 and limits the distance which said valve piston 340 can be moved toward the right by said spring 345. The drawing shows the position of the parts when the end piece 346 is against the end of the valve housing 331, with the valve piston 340 in the maximum position toward the right to which it can be moved by the spring 345. The arrangement is such that when the valve piston 340 is in this position, the head 341 is to the right of the cylinder port 339 so that said cylinder port 339 is connected with the exhaust end of the valve bore 332 a short over-run beyond the point at which this connection is established also being preferably provided in this direction of movement of the valve piston 340. As the valve piston 340 is not attached to the end piece 346 it is capable of movement still farther toward the right than the position in which it is shown in Fig. 5; such movement is unlikely to occur because of pressure existing on that side but the maximum travel in this direction is limited by the plug 334 which closes the high pressure end 333 of the valve bore 332.

The spring 345 is enclosed by a housing 347, one end of which is suitably connected to the valve housing 331, as by the screw threaded connection shown, and the other end of which is closed by a plug 348. A screw 349 extends through the plug 348 and provides means for adjusting the compression of the spring 345, the screw 349 abutting against an abutment member 350 in engagement with the spring 345.

In operation the pump 310 is continuously driven and provides continuous delivery of pressure fluid which passes into the discharge conduit 313, through the directional valve 315 and to the power cylinder 316 which is actuated thereby.

Pressure fluid from the discharge conduit 313 also passes through the pipe 335 into the high pressure end 333 of the valve bore 332 where it acts upon the exposed end of the valve piston 340, as already explained. During rapid traverse the pressure of this fluid, as previously stated, is relatively low so that the force which it exerts on the exposed end of the valve piston 340 is insufficient to overcome the opposing force of the spring 345 and the parts assume the position shown. The valve piston 340 is then in its extreme working position toward the right and its head 341 is to the right of the cylinder port 339. The cylinder port 339 is thus connected with the exhaust end of the valve bore 332, so that fluid may be exhausted from the right hand end of the adjusting cylinder 322 through the pipe connection 324, the bore 332, the exhaust port 337 and the pipe 338 to the tank 312. The adjusting piston 321 and adjusting rod 320, under action of the spring 325, are moved to their extreme outward or delivery increasing position as determined by the stop 327 and are held in this position as long as the fluid in the discharge conduit 313 and high pressure end 333 of the valve bore 332 remains under low pressure, as is the case during rapid traverse. The pump 310 is thus caused to deliver its maximum volume, as determined by the stop 327, under relatively low pressure for rapid traverse.

The resistance presented by the power cylinder 316 will immediately increase to a relatively high amount upon completion of rapid traverse and the beginning of feed or slow traverse, causing a corresponding immediate increase in the pressure of the fluid in the discharge conduit 313 and the high pressure end of the valve bore 332. The force exerted by this relatively high pressure fluid on the end of the valve piston 340 overcomes the resistance presented by the spring 345 and moves the valve piston 340 to its working position toward the left, in which position the valve head 341 is to the left of the cylinder port 339. The high pressure end of the valve bore 332 is thus connected with the cylinder port 339 so that pressure fluid is admitted to the right hand end of the adjusting cylinder 322. The adjusting piston 321 is immediately moved inward or in a delivery decreasing direction as far as permitted by the stop 328. This movement of the adjusting piston 321 causes similar movement, of course, of the adjusting rod 320 so that the volume of fluid delivered by the pump 310 is reduced to the minimum determined by the stop 328 and is held in this minimum delivery position as long as the pressure of the fluid acting on the end of the valve piston 340 in the high pressure end of the valve bore 332 remains at the high value, as will be the case throughout feed or slow traverse.

The pressure of the fluid in the discharge conduit 313 and hence in the high pressure end of the valve bore 332 will again drop to a relatively low amount upon completion of feed or slow traverse and the beginning of rapid traverse. Immediately upon this pressure drop, the valve piston 340, the adjusting piston 321 and adjusting rod 320 will be returned to their positions as shown and the fluid volume delivered by the pump 310 will thus immediately be increased to the maximum determined by the stop 327. The pressure in 313 varies over a large range and there is no attempt to regulate or maintain any predetermined pressure. It requires a very large increase in pressure to move the elongated valve 341 over to the left sufficiently far to connect the cylinder 322 with bore 333. Thus there is a large range of pressure drop between the feed and rapid traverse strokes, and vice versa, and at the beginnings of these strokes the delivery adjusting mechanism 320, 322 shifts instantaneously over from one extreme position to the other. There is no intermediate working position of this mechanism and in each extreme position thereof the pressure may vary considerably without shifting the valve 341 far enough to connect or disconnect the cylinder 322 with 335, 313.

The hydraulic relay valve 331, 341 not only functions to control the variable delivery mechanism but also serves as an excess pressure relief or safety valve. For example, if the pressure in 313 should for any reason rise to an excessive value the valve 341 is moved over far enough to connect the bore 332 with the annular cylinder port 337 and exhaust line 338 and give instant relief. This does not alter the position of the variable delivery mechanism which remains in position all the way over to the left until there is a considerable drop in pressure, due for instance to an abrupt drop in resistance encountered by the work member.

The control valve and power adjusting mechanism of the present invention therefore act cooperatively to effect delivery of the maximum volume of fluid at low pressure for rapid traverse and to effect delivery of minimum fluid volume at relatively high pressure for feed or slow traverse and also to function as an excess pressure relief. A separate relief valve and pipe connections are thereby dispensed with, without impairing the efficiency or operation of either the relay valve or the variable delivery mechanism. The change from maximum to minimum volumes or vice versa, is made responsive to change in the pressure of the working fluid in the discharge conduit 13 and, while described somewhat progressively, takes place substantially instantaneously and without interruption. The fluid volume delivered by the pump 310 is thus at all times kept at either maximum or minimum except, of course, for the constantly changing volume incident to the almost instantaneous variation from one to the other of these extreme amounts, which is practically negligible. By adjustment of the stops 327 and 328, the high and low fluid volumes may be made such as to produce the desired rates of movement of the power cylinder 316 for rapid traverse and for feed or slow traverse respectively. Likewise, by adjustment of the compression of the spring 345 the pressure of the fluid in the discharge conduit 313 required to effect the shift from maximum to minimum volume, or vice versa, may be varied and controlled. Relief valve action is obtained for any adjustment of the spring 345, thus limiting the maximum pressure that can be imposed upon the piston in the working cylinder 316 and regulating the speed of said piston conformably with changes in resistance encountered. It is usually practical to adjust the compression of the spring 345 so as to provide relief valve action at the pressure which it is desired to employ for the feed stroke of the cylinder 316 without respect to the pressure at which the shift from large volume to small volume takes place because of the relatively great difference between the pressures usually employed for the rapid traverse and feed strokes.

The volumes delivered both for rapid traverse and for feed or slow traverse are held steady without surging or pulsation due to change in the pump's delivery. There is no "hunting" and the delivered volume is not affected by minor variations in operating pressure of the fluid in the discharge conduit 313.

In addition to the operating advantages which it makes possible, the novel construction of the control valve mechanism also results in easy and relatively inexpensive manufacture. Only one close fit is required in its entire structure and that is the relatively simple one of fitting the valve piston 340 into the valve bore 332. The valve head 341 and guiding surfaces 342 are of the same diameter so that the valve piston 340 may be readily ground from end to end to the proper size.

No other precise sizes are required anywhere in the structure and ordinary machine tolerances, such as ±.010″ or ±1/64″, may be otherwise used throughout. For example, it is not necessary to hold the length of the valve bore 332 or of the valve piston 340 to a precise dimension. Likewise, there is no exact requirement either as to the width (i. e. axial length) of the cylinder port 339 and valve head 341 or as to their relative positions in the valve bore 332 and on the valve piston 340 respectively. Minor variations in size or relative position of these parts merely affects the amount of over-run of the valve head 341.

Another feature of this control valve mechanism is that the high pressure fluid is confined to the bore of the short and relatively easily made valve housing 331, in which all fluid connections to and from the valve mechanism are also made. This permits the use of inexpensive material such as thin steel tubing for the spring housing 347, as its bore is connected with the exhaust, and also makes it possible to use simple threaded joints at both ends of the spring housing.

It will be observed that in all operations the adjusting piston remains in its adjusted position while the piston head 341 covers the port 339. The piston 321 is shifted from the maximum output position to the minimum output position only when the right hand end of the piston head 341 uncovers the port 339. Similarly, once the piston 321 is shifted to the minimum output position it remains in such position until the left hand end of the piston head 341 uncovers the port 339 to connect the latter with the exhaust port 337, the fluid in the adjusting cylinder 322 being locked to hold the piston in the adjusted position while the piston head 341 covers the port 339. It is thus seen that for each stroke of the piston in the cylinder 316 the pressures in the discharge conduit 313 may vary very appreciably over a substantial range without changing the adjusted position of the piston 321, namely, in the rapid traverse low pressure position the piston head 341 may move over a considerable range without either connecting the port 339 with the discharge conduit or disconnecting the cylinder 322 with the exhaust port 337. Similarly, there is quite an appreciable range of movement of the piston head 341 during the high pressure feed stroke without disconnecting the cylinder 322 with the discharge conduit 313 or without reconnecting the cylinder 322 with the exhaust port 337.

It will be understood that the foregoing are merely exemplifying disclosures and that changes may be made in the apparatus without departing from applicant's invention which is defined in the appended claims. Thus, for example, the valve mechanisms illustrated in Figs. 2 and 3 may be employed in connection with the fluid pressure system of Fig. 1 and, similarly, the valve mechanisms illustrated in Figs. 1 and 4 may be employed in connection with the fluid pressure system of Figs. 2 and 3. Moreover, the valve mechanism may take numerous forms and may be capable of effecting variation of the pump's output to cause change in the speed of the fluid actuated driven member in various ways. It will also be understood that, while the invention has been illustrated in connection with conventional power adjusting means in which pressure fluid is admitted to only one end of each adjusting cylinder, as is now the general practice, the invention may also be embodied in valve mechanism for use in connection with adjusting cylinders of the well known type in which pressure fluid is admitted to one end of each adjusting cylinder to cause movement of its adjusting piston in one direction and is admitted to the other end of each adjusting cylinder to cause movement of its adjusting piston in the opposite direction.

In all modifications the fluid pressure control valve means is of marked simple construction and functions accurately and reliably to both control the delivery varying fluid servo-motor and relieve excess pressure. Though embodied as a part of the same control valve member, the pressure relief feature does not interfere with or disturb the operation of the fluid servo-motor which controls the pump delivery, and smooth reliable operation is obtained at all times with no hunting, notwithstanding the presence of the relief feature. Moreover, with the control valve of this invention the setting for both the pump delivery and the relief pressure operations is simultaneously effected by adjustment of the same means, the two being thus properly and definitely correlated together. In the usual operation of modification Figs. 1 to 4 the construction and correlation is such that the fluid servo-motor for varying the delivery is mainly relied on to limit the delivery, with the pressure relief feature coming into operation only after the servo-motor has reached the near zero delivery position, although if the pressure should rise to an excessive value too rapidly for the delivery varying means to function alone the relief feature co-operates therewith to reduce the pressure.

In all embodiments the relief valve action does not take place until the output of the pump has been reduced to minimum, that is, in the normal operation, although in certain cases it is conceivable that the pressure may rise so fast as to open the relief valve port prior to the pump delivery mechanism reaching the minimum stroke position. In any case, whenever the valve mechanism is functioning as a relief valve the exhaust and hence reduction in pressure takes place at a point beyond and removed from the connection between the valve bore and the adjusting cylinder so that pressure is maintained in said adjusting cylinder.

I claim:

1. In mechanism for controlling the output of a variable-output pump and for relieving excess pump pressure, said pump having a fluid discharge conduit, in combination, fluid pressure operated output-varying means for altering the output of said pump and valve mechanism for controlling the operation thereof, said valve mechanism including a pressure fluid admission port connected with said pump's discharge conduit, a fluid exhaust port and an operating port connected with said fluid pressure operated output-varying means, and said valve mechanism also including valve piston means having a neutral position in which fluid communication between all of said ports is cut off and said output-varying means is rendered inoperative, said valve piston means being movable in one direction from its neutral position to connect said exhaust port with said operating port, thereby causing output increasing operation of said output-varying means, said valve piston means also being movable through a first range in the other direction from its neutral position to connect said admission port with said operating port, thereby causing output decreasing operation of said output-varying means, and said valve piston means being further movable through a second range in said last named direction to connect all three of said ports, thereby reducing pump output to minimum and permitting escape of pressure fluid from said discharge conduit through said exhaust port to relieve excess pump pressure.

2. In a mechanism for controlling the output of a variable-output pump and for relieving excess pump pressure said pump having a fluid discharge conduit, in combination, fluid pressure operated output-varying means for altering the output of said pump and valve mechanism for controlling the operation thereof, said valve mechanism including a pressure fluid admission port connected with said pump's discharge conduit, a fluid exhaust port and an operating port connected with said fluid pressure operated output-varying means, and said valve mechanism also including a single valve piston having a neutral position in which fluid communication between all of said ports is cut off and said output-varying means is rendered inoperative, said valve piston being movable in one direction from its neutral position to connect said exhaust port with said operating port, thereby causing output increasing operation of said output-varying means, said valve piston also being movable through a first range in the other direction from its neutral position to connect said admission port with said operating port, thereby causing output decreasing operation of said output-varying means, and said valve piston being further movable through a second range in said last named direction to connect all three of said ports, thereby reducing pump output to minimum and permitting escape of pressure fluid from said discharge conduit through said exhaust port to relieve excess pump pressure.

3. In a fluid pressure system comprising a variable-output pump, a discharge conduit and fluid pressure means for varying the output thereof, a control valve provided with a bore having one end thereof continuously in communication with said discharge conduit, said bore having a port in communication with said fluid pressure means and another port in communication with an exhaust, said first named port being positioned intermediate said second named port and the point of communication between said valve bore and said discharge conduit, a valve member having one end exposed to pressure fluid from said discharge conduit, said valve member being movable in said bore responsively to fluid pressure acting on the exposed end thereof and a biasing means on the other, said valve member being adapted to occupy one position with both said ports connected together and disconnected from the discharge conduit, a second position to connect the first named port with the conduit with the exhaust port disconnected and a third position with both of said ports connected with the discharge conduit by said valve member.

4. In a fluid pressure system comprising a variable-output pump, a discharge conduit and fluid pressure means for varying the output thereof, a control valve having a bore in communication with said discharge conduit, said bore having a port in communication with said fluid pressure means and another port in communication with an exhaust, a valve member movable in said bore responsively to fluid pressure on one side and a biasing means on the other, said valve member being adapted to occupy one position in which it connects both of said ports with each other and disconnects them from the conduit, a second position wherein the valve member closes the first named port, a third position in which said valve member connects the first named port with the conduit and disconnects them from the exhaust port and a fourth position in which said valve member connects both of said ports with the discharge conduit.

5. In means for controlling fluid-power output-varying means of a variable-output pump, said pump having a discharge conduit receiving pressure fluid therefrom, in combination, valve mechanism having an inlet port for admitting operating pressure-fluid from said discharge conduit thereto, a fluid outlet port for emission of fluid therefrom, an operating port in said valve mechanism for admission of fluid to or exhaust of fluid from said fluid-power output-varying means to cause the operation thereof, said fluid-power output varying means functioning responsive to admission of pressure fluid thereto to reduce the output of said pump and functioning responsive to exhaust of fluid therefrom to increase said pump's output, means for connecting said operating port with either said inlet port or said outlet port to cause operation of said output-varying means, and means automatically active, responsive to pressure in said inlet conduit in excess of a predetermined value, to connect said inlet port with both said operating port and said outlet port, whereby the output of said pump is reduced and pressure in said discharge conduit is relieved by escape of fluid through said port.

6. In mechanism for controlling the output of a variable-output pump and for relieving excess pump pressure, said pump having a fluid discharge conduit, in combination, fluid pressure operated output-varying means for altering the output of said pump, valve mechanism for controlling the operation thereof including a pressure fluid admission port connected with said discharge conduit, a fluid exhaust port and an operating port connected with said fluid pressure operated output-varying means and means moving in unison for connecting said operating port with either said admission port or said exhaust port to regulate and vary the output of said pump and for connecting said admission port with said other two ports to reduce pump output and simultaneously permit escape of pressure fluid from said discharge conduit to relieve excess pump pressure.

7. In mechanism for controlling the output of a variable-output pump and for relieving excess pump pressure, said pump having a fluid discharge conduit, in combination, fluid power actuated output-varying means for altering the output of said pump and valve mechanism connected with said discharge conduit, said valve mechanism including an element movable to regulate admission of pump discharge pressure fluid to and exhaust of fluid from said output-varying means to control the operation thereof and automatically movable responsive to pump discharge pressure above a predetermined value to directly provide pressure relief escape for fluid discharged by said pump.

8. In mechanism for controlling the output of a variable-output pump and for relieving excess pump pressure, said pump having a fluid discharge conduit, in combination, fluid pressure operated output-varying means for altering the output of said pump and valve mechanism for controlling the operation thereof, said valve mechanism including a pressure fluid admission port connected with said pumps's discharge conduit, a fluid exhaust port and an operating port connected with said fluid pressure operated output-varying means, said valve mechanism also including valve piston means active responsive to pressure in said discharge conduit below a predetermined value to connect said operating port with said exhaust port, whereby said output-varying means is operated to increase pump output, said valve piston means also being active responsive to pressure in said discharge conduit above said predetermined value to first connect said operating port with said admission port, whereby said output-varying means is operated to decrease pump output, and then to connect said admission port with said exhaust port, whereby said output-varying means is operated to reduce pump output and pressure fluid from said discharge conduit is permitted to escape through said exhaust port.

9. In mechanism for controlling the output of a variable-output pump and for relieving excess pump pressure, said pump having a fluid discharge conduit, in combination, fluid pressure operated output-varying means for altering the output of said pump and valve mechanism for controlling the operation thereof, said valve mechanism being connected with said discharge conduit and including valve piston means having a neutral position in which said output-varying means is rendered inoperative, spring means active to bias said valve piston means away from its neutral position in a direction to cause output increasing operation of said output-varying means, fluid pressure means actuated by fluid discharged by said pump and active upon said valve piston means in opposition to said spring means and biasing said valve piston means away from its neutral position in a direction to first cause output decreasing operation of said output-varying means and to then uncover a fluid escape port for pump discharge pressure fluid.

10. In mechanism for controlling the output of a variable-output pump and for relieving excess pump pressure, said pump having a fluid discharge conduit, in combination, fluid pressure operated output-varying means for altering the output of said pump and valve control mechanism, said valve mechanism including a pressure fluid admission port connected with said discharge conduit, a fluid exhaust port and an operating port connected with said fluid pressure operated output-varying means, said valve mechanism also including valve piston means active responsive to pressure in said discharge conduit below a predetermined value to connect said operating port with said exhaust port, whereby said output varying means is operated to increase pump output, said valve piston means also being active responsive to pressure in said discharge conduit exceeding said predetermined value by a predetermined amount to connect said admission port with said operating port, whereby said output varying means is operated to decrease pump output, and said valve piston means being further active responsive to increase in fluid pressure in said discharge conduit to a value greater than but related to said last named amount to connect all three of said ports, whereby the output of said pump is reduced and escape of pressure fluid through said exhaust port is permitted.

11. In valve mechanism for controlling fluid-power output-varying means of a variable-output pump, said pump having a discharge conduit receiving pressure fluid therefrom, a pressure-fluid inlet port for admitting operating pressure-fluid to said valve mechanism from said discharge conduit, a fluid outlet port for emission of fluid therefrom, an operating port in said valve mechanism for admission of fluid to or exhaust of fluid from said fluid-power output-varying means to cause the operation thereof, said fluid-power output-varying means functioning responsive to admission of pressure fluid thereto to reduce the output of said pump and functioning responsive to exhaust of fluid therefrom to increase said pump's output, means for connecting said operating port with either said inlet port or outlet port to cause operation of said fluid-power output-varying means, and means automatically operative to connect said inlet port with both said operating port and said outlet responsive to pressure in said inlet port in excess of a predetermined value, whereby the output of said pump is reduced to minimum and pressure in said discharge conduit is relieved by escape of fluid through said outlet port.

12. In a fluid pressure system comprising a variable-output pump, a discharge conduit and fluid pressure means for varying the output thereof, a control valve having a bore in communication with said discharge conduit, said bore having a port in communication with said fluid pressure means and another port in communication with an exhaust, a valve member movable in said bore responsively to fluid flow in said conduit on one side and a biasing means on the other, said valve member being adapted to occupy one position with both said ports connected together and disconnected from the discharge conduit, a second position to connect the first named port with the conduit with the exhaust port disconnected and a third position with both of said ports connected with the discharge conduit.

13. In a fluid pressure system comprising a variable-output pump, a discharge conduit and fluid pressure means for varying the output thereof, said fluid pressure means comprising a piston adapted to occupy any intermediate position between maximum and minimum output positions, a control valve having a bore in communication with said discharge conduit, said bore having a port in communication with said fluid pressure means and another port in communication with an exhaust, a valve member movable in said bore responsively to the pressure in said conduit on one side and a biasing means on the other and having a head width just sufficient to cover the first named port, said valve member being adapted to occupy one position in which it connects both of said ports with each other and disconnects them from the discharge conduit, a second position in which said valve member connects the first named port with the conduit and disconnects said first named port and said conduit from the exhaust port and a third position in which said valve member connects both of said ports with the discharge conduit.

14. In a fluid pressure system comprising a variable-output pump, a discharge conduit and fluid pressure means for varying the output thereof, a control valve having a bore in communication with said discharge conduit, said bore having a port in communication with said fluid pressure means and another port in communication with an exhaust, a valve member movable in said bore responsively to pressure in said conduit on one side, a second valve member through which said first named port communicates with said conduit, means for biasing said valves against the fluid pressure and means for equalizing the biasing means, said valve members being adapted to occupy one position in which both said ports are connected together and are disconnected from the discharge conduit, a second position in which the first named port is connected with the conduit and is disconnected from the exhaust port and a third position in which both of said ports are connected with the discharge conduit.

15. In a fluid pressure system comprising a variable-output pump, a discharge conduit and fluid pressure means for varying the output thereof, a control valve having a bore in communication with said discharge conduit, said bore having a port in communication with said fluid pressure means and another port in communication with an exhaust, a valve member movable in said bore responsively to fluid pressure on one side and a biasing means on the other, a fluid pressure cylinder and a piston therein operatively connected with said valve member and a manually adjustable means for varying the connection between said piston and said valve member, said valve member being adapted to occupy one position with both said ports connected together and disconnected from the discharge conduit, a second position to connect the first named port with the conduit with the exhaust port disconnected and a third position with both of said ports connected with the discharge conduit.

16. In a slow feed high pressure and rapid traverse low pressure fluid pressure system comprising a variable output pump, a discharge conduit, and a fluid pressure means for varying the output having an operative member limited by stops for a low output at high pressure and a high output at low pressure, a control valve having a bore in communication with said discharge conduit, said bore having a port in communication with said fluid pressure means and another port in communication with an exhaust, a valve member movable in said bore responsively to fluid pressure on one side and a biasing means on the other, said valve member being adapted to occupy one position with both said ports connected together and disconnected from the discharge conduit, a second position to connect the first named port with the conduit with the exhaust port disconnected and a third position with both of said ports connected with the discharge conduit, said valve member having an elongated head controlling the ports and requiring a large increase in pressure to move the member from the first to the second position.

17. In a fluid pressure power transmission system comprising a fluid operated member and a variable delivery pump supplying to said member the whole fluid volumes needed for both rapid traverse low pressure and slow traverse high pressure strokes, in combination, fluid pressure means for varying the delivery of said pump, said means being biased to one position when not opposed by fluid pressure to cause said pump to deliver the fluid volume required for one of said strokes and operative to another position by fluid pressure against said biasing means to deliver the fluid volume required for the other stroke, and a control valve having an elongated bore in communication at one point with the outlet side of said pump, said bore having a port longitudinally spaced from said point of communication and in communication with said fluid pressure means and an exhaust port on the opposite side of said first named port from said point of communication and a valve member movable in said bore responsively to the fluid pressure of the outlet side of said pump on one side and a biasing means on the other, said valve member having one range of movement corresponding to one of said strokes wherein the fluid pressure means is maintained disconnected from the fluid pressure supply notwithstanding appreciable variations in pressure during said stroke and another range of movement corresponding to the other stroke wherein the fluid pressure means is maintained connected with the fluid pressure supply notwithstanding appreciable variations in pressure during said last named stroke, but shiftable from one range to the other upon the large variations in pressure due to transition of the fluid operated member from one stroke to the other and being further shiftable at a predetermined pressure to connect said exhaust port with the fluid pressure supply.

18. In mechanism for controlling the output of a variable-output pump and for relieving excess pump pressure, said pump having a fluid discharge conduit, in combination, fluid pressure operated output-varying means for altering the output of said pump and valve mechanism for controlling the operation thereof, said valve mechanism including a pressure fluid admission port connected with said pump's discharge conduit, a fluid exhaust port and an operating port connected with said fluid pressure operated output-varying means, said operating port being intermediate said admission and exhaust ports and said valve mechanism also including valve piston means having a neutral position in which fluid communication between all of said ports is cut off and said output-varying means is rendered inoperative, said valve piston means being movable in one direction from its neutral position to connect said exhaust port with said operating port, thereby causing output increasing operation of said output-varying means, said valve piston means also being movable through a first range in the other direction from its neutral position to connect said admission port with said operating port, thereby causing output decreasing operation of said output-varying means, and said valve piston means being further movable through a second range in said last named direction to connect all three of said ports, thereby reducing pump output to minimum and permitting escape of pressure fluid from said discharge conduit at a point beyond said operating port to relieve excess pump pressure.

CHARLES M. KENDRICK.